(No Model.)
R. T. TORKELSON.
BICYCLE SADDLE.
No. 523,386. Patented July 24, 1894.
Fig. 1.
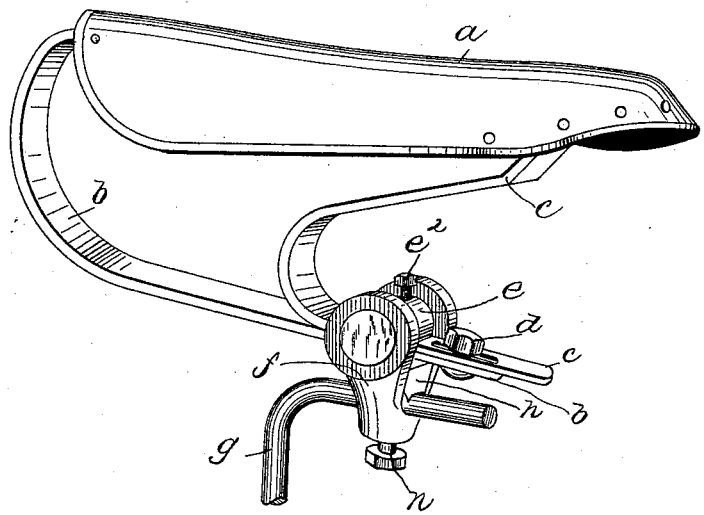
Fig. 2.
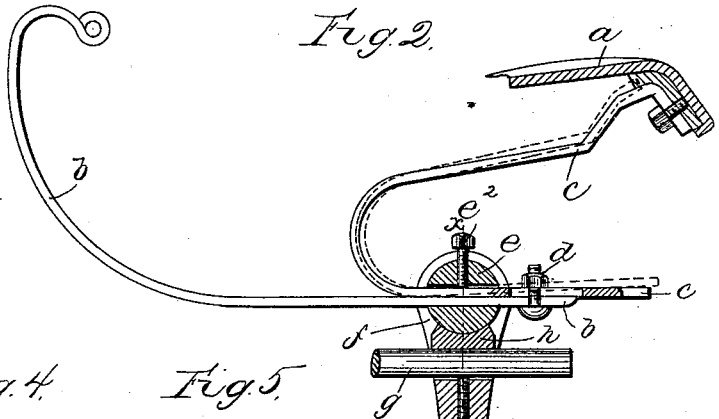
Fig. 4. Fig. 5.
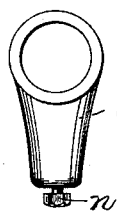 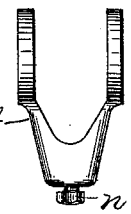
Fig. 3. Fig. 6. Fig. 7.
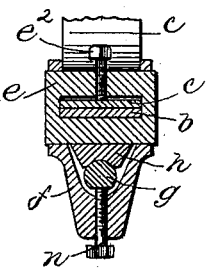  
Witnesses
Jas. J. Maloney
A. J. Locke
Inventor,
Reinhard T. Torkelson,
by Jos. P. Simmons
Att'y.
THE NORRIS PETERS CO., PHOTO-LITHO., WASHINGTON, D. C.

UNITED STATES PATENT OFFICE.

REINHARD T. TORKELSON, OF WORCESTER, MASSACHUSETTS, ASSIGNOR OF ONE-HALF TO JOHN C. SPEIRS, OF SAME PLACE.

BICYCLE-SADDLE.

SPECIFICATION forming part of Letters Patent No. 523,386, dated July 24, 1894.

Application filed June 20, 1892. Serial No. 437,335. (No model.)

*To all whom it may concern:*

Be it known that I, REINHARD T. TORKELSON, of Worcester, county of Worcester, State of Massachusetts, have invented an Improvement in Bicycle-Saddles, of which the following description, in connection with the accompanying drawings, is a specification, like letters on the drawings representing like parts.

My invention relates to a saddle for bicycles or similar vehicles and consists mainly in the combination and arrangement of devices by which the seat is supported in proper condition of tenseness and is connected with the support on the vehicle frame, so that it can be adjusted to various positions according to the desire of the rider.

Figure 1 is a perspective view of the saddle in its support; Fig. 2 a side elevation thereof partly in longitudinal section; Fig. 3 a transverse vertical sectional detail on the plane indicated by the dotted lines $x$, $x$, Fig. 2, and Figs. 4 and 5 a side and end elevation respectively, of the stirrup piece by which the saddle is connected with the supporting frame work; Figs. 6 and 7 similar views of the seat piece.

The seat portion $a$ of the saddle may be of usual shape and material and is connected at its forward end with a bow shaped spring $b$ which curves backward so that its shank portion extends along beneath the seat $a$. The rear end of the seat $a$ is connected with the usual frame piece or cantle which is rigidly connected with a second spring $c$ which extends forward and downward in inclined direction from the cantle and then curves backward so as to overlie the rear part of the front spring $b$. The two springs are united near their rear ends by a bolt $d$ passing through a slot in one of the said springs so as to provide for longitudinal adjustment of one upon the other and thereby placing the seat $a$ under the desired tension, backward movement of the spring $c$ on the spring $b$ causing the seat to be made more tense. The shank portions of the two springs pass somewhat loosely through a longitudinal passage in a cylindrical block $e$ in which the said springs are locked firmly when set in proper position by means of a set-screw $e^2$, said block and set-screw constituting a spring holding clamp.

The ends of the block $e$ pass into openings in the end of a stirrup shaped piece $f$ which embraces the usual seat supporting standard $g$ as shown. A bearing block or seat piece $h$ is interposed between the supporting standard $g$ and the saddle block $e$ as shown, said seat piece $h$ having a longitudinal groove in its under surface as shown in Fig. 3, to rest upon the top of the standard $g$ and a transverse groove in its upper surface as shown in Fig. 2, to receive the saddle block $e$ which thus may be rocked in its pivotal connection with the stirrup piece to vary the tilt of the saddle fore and aft, on said seat piece $h$ and in the openings in the end of the stirrup $f$.

The entire seat supporting part is made fast upon the standard $g$ by a locking bolt $n$ working in the stirrup piece $f$ and bearing against the under side of the standard $g$ the pressure of said bolt gripping the standard $g$ between the end of the bolt and seat piece $h$ and at the same time drawing the stirrup piece $f$ downward so as to press the block $e$ against the said piece $h$ and the latter against the standard thereby securely fastening the saddle in adjusted position on the standard $g$.

If it is necessary to tighten the saddle the set screw $e^2$ and the bolt $d$ may be loosened when by pulling the shank of the spring $c$ backward on the shank of the spring $b$ the rear end of the spring $c$ is tilted upward from that of the spring $b$ (as shown in dotted lines Fig. 2) and by drawing the rear end of the springs together by tightening the bolt $d$ the upper end of the rear springs will be drawn backward with a lever action thus putting the desired strain on the seat $a$. When the seat is thus brought to the desired tension it may be adjusted forward and backward by sliding the shank portion of the springs $b, c$, in the seat piece $e$ before tightening the bolt $e^2$ and also by moving the entire apparatus back and forth on the horizontal arm of the supporting frame piece $g$ while the bolt $n$ is slackened, these parts being fastened by tightening the bolts $e^2$ and $n$ when the parts are properly adjusted.

The inclination or tilt of the saddle fore and aft may be adjusted by turning the block $e$ in the openings of the stirrup piece and on the seat piece $h$ as a pivotal bearing, the bolt

*n* being loosened to permit of such pivotal movement and then tightened to lock the parts after their position is properly adjusted.

Thus strong, simple, and efficient means are provided for making all the horizontal adjustments of the saddle to suit the convenience of any rider.

I claim—

The combination of the seat and its supporting springs; with a block and means to fasten the said saddle springs therein; the stirrup piece adapted to embrace the seat supporting standard and having pivotal engagement with said block; a bearing piece to be interposed between the said block and the supporting standard; and means for clamping said bearing piece, stirrup piece, and block to the seat supporting standard and against relative movement with relation to one another, substantially as and for the purpose described.

In testimony whereof I have signed my name to this specification in the presence of two subscribing witnesses.

REINHARD T. TORKELSON.

Witnesses:
 JOS. P. LIVERMORE,
 JAS. J. MALONEY.